United States Patent
Iustin

(10) Patent No.: US 12,077,018 B2
(45) Date of Patent: Sep. 3, 2024

(54) SYSTEM AND A METHOD THEREIN FOR ENABLING A DETERMINATION OF A LOCATION OF A TIRE SENSOR ON A CHASSIS OF A VEHICLE

(71) Applicant: VOLVO TRUCK CORPORATION, Gothenburg (SE)

(72) Inventor: Roman Iustin, Mölnlycke (SE)

(73) Assignee: VOLVO TRUCK CORPORATION, Gothenburg (SE)

(*) Notice: Subject to any disclaimer, the term of this patent is extended or adjusted under 35 U.S.C. 154(b) by 82 days.

(21) Appl. No.: 17/806,330

(22) Filed: Jun. 10, 2022

(65) Prior Publication Data
US 2022/0398388 A1  Dec. 15, 2022

Related U.S. Application Data

(63) Continuation of application No. PCT/EP2021/065847, filed on Jun. 11, 2021.

(30) Foreign Application Priority Data

Mar. 9, 2022 (EP) .................................. 22161070.2

(51) Int. Cl.
*B60C 23/04* (2006.01)
*B60C 25/05* (2006.01)

(52) U.S. Cl.
CPC ...... *B60C 23/0461* (2013.01); *B60C 25/0548* (2013.01); *B60C 23/0416* (2013.01)

(58) Field of Classification Search
CPC ............ B60C 23/0461; B60C 25/0548; B60C 23/0416; B60C 23/0472; B60C 23/0471
See application file for complete search history.

(56) References Cited

U.S. PATENT DOCUMENTS 7,222,522 B2  5/2007 Monguzzi et al.
8,903,602 B2  12/2014 Bailie et al.
(Continued)

FOREIGN PATENT DOCUMENTS

DE  102010026872 A1  1/2012
EP  2202099 A1  6/2010
(Continued)

OTHER PUBLICATIONS

International Search Report and Written Opinion in corresponding International Application No. PCT/EP2021/065847 mailed Jan. 28, 2022 (13 pages).
(Continued)

*Primary Examiner* — Andrew W Bee
(74) *Attorney, Agent, or Firm* — Venable LLP; Jeffri A. Kaminski

(57) ABSTRACT

A system and a method for enabling a determination of a location of a tire sensor on a chassis of a vehicle is provided. The method comprises obtaining an identity of a RFID tag located on the rim, or in the tire, of the wheel. The method also comprise obtaining an identity of a tire sensor mounted on the rim, or inside the tire, of the wheel, as the tire sensor is activated. The method further comprise establishing an association between the identity of the RFID tag and the identity of the tire sensor. A computer program product and a carrier are also provided.

12 Claims, 3 Drawing Sheets

(56) References Cited

U.S. PATENT DOCUMENTS

| | | |
|---|---|---|
| 8,935,042 B2 | 1/2015 | Taylor et al. |
| 2015/0273955 A2 | 10/2015 | Hammer |
| 2017/0174013 A1 | 6/2017 | Fenkanyn et al. |
| 2019/0299725 A1 | 10/2019 | Maehara |
| 2021/0339583 A1* | 11/2021 | Regef ................ B60C 23/0471 |

FOREIGN PATENT DOCUMENTS

| | | |
|---|---|---|
| JP | 10302187 A | 11/1998 |
| JP | 2008100613 A | 5/2008 |
| JP | 4260532 B2 | 4/2009 |
| JP | 2012126341 A | 7/2012 |
| WO | 2005072993 A1 | 8/2005 |
| WO | 2020036492 A1 | 2/2020 |

OTHER PUBLICATIONS

European Search Reported dated Sep. 6, 2022 in corresponding European Patent Application No. 22161070.2, 7 pages.

* cited by examiner

SYSTEM AND A METHOD THEREIN FOR ENABLING A DETERMINATION OF A LOCATION OF A TIRE SENSOR ON A CHASSIS OF A VEHICLE

CROSS-REFERENCE TO RELATED APPLICATIONS

This application is a continuation application of PCT/EP2021/065847, filed Jun. 11, 2021. This application claims the benefit of European Patent Application No. 22161070.2, filed Mar. 9, 2022, all of which are hereby incorporated by reference in their entireties.

TECHNICAL FIELD

Embodiments herein relate in general to tire sensors. In particular, embodiments herein relate to a system and a method for enabling a determination of a location of a tire sensor on a chassis of a vehicle. Further, the embodiments herein also relate to computer program products for performing the method and computer program product carrier.

BACKGROUND

In vehicles today, in particular heavy-duty vehicles such as semi-trailer vehicles or trucks for cargo transport, one or more central electronic control units, ECUs, may be implemented on-board the vehicle in order to read and collect sensor readings from various different types of wireless wheel sensors on-board the vehicle. In some cases, tire sensors may be located in or on the tires or rims on the wheels of the vehicle. The sensor data transmitted from these tire sensors may comprise, for example, tire pressure, tire temperature, tire deformation, the identity of the sensor, etc. These types of systems are conventionally referred to as Tire Pressure Monitoring Systems, TPMS, or Tire Health Systems, THS. TPMS/THS systems also normally employ Radio Frequency, RF, transmissions operating on specifically dedicated frequencies for transmitting its sensor data the on-board ECU or external sensor data receivers. In additional to such TPMS/THS systems, each tire and/or rim of a wheel may also have one or more integrated or mounted Radio Frequency Identification, RFID, sensors, i.e. RFID tags, for enabling identification of the specific tire and/or specific rim of a wheel. RFID also employs RF transmissions.

After assembly of the wheels on the vehicle at an assembly line, or re-mounting of the wheels due to tire rotation or similar in a tire fitting centre/workshop, the TPMS/THS system may need to be informed about exactly in which wheel location on the vehicle each tire sensor is located. This is order for the TPMS/THS system to have information about where on the chassis of the vehicle each specific tire sensor is located. One way to determine tire sensor positions on a vehicle is to manually register each tire sensor's position and input this into the central TPMS/THS system. Normally, this manual procedure is performed by selecting a wheel at a specific wheel location and then to hit the tire at the selected wheel location with a mallet or hammer in order to create a small pressure variation inside the tire of the wheel. The small pressure variation will then be sensed by and activate the tire sensor of the wheel in the specific wheel location. The tire sensor will then transmit a Radio Frequency, RF, signal with its identity embedded or modulated in the RF signal. The RF signal may thus be received by the central TPMS/THS system in the ECU. However, due to the human factor, this manual procedure is prone to errors. Another way to activate the tire sensor of the wheel in the specific wheel location is to generate a Low-Frequency, LF, magnetic field in proximity to the tire sensor. In response to receiving the LF magnetic field, the tire sensor may be activated and begin to transmit the RF signal comprising its identity. However, a disadvantage with this method is that some assembly lines may be restricted to maximum allowed power limits when using LF magnetic fields, which may limit its application. Additionally, LF magnetic field activation may also be difficult due to the fact that some tire sensors may have limited sensitivity to LF magnetic fields. A third way in which the tire sensor may be activated and its location determined is to use auto-location as described in the US patent application U.S. Pat. No. 8,903,602. This method, however, requires signals from other sensors, such as, e.g. speed sensors of an on-board Automatic Brake System, ABS, system, accelerometers providing rotational directions, etc., or having additional range extenders placed on each side of the chassis in order to locate from which side or from which wheel the RF signal of the tire sensor was sent. Besides requiring additional hardware, this method also requires active driving on roads and reaching specific speeds for a certain period of time before all necessary sensor readings may be obtained. Hence, it will be difficult to determine the locations of all tire sensors at an assembly line of a factory, an automotive workshop or tire fitment centre that mounts or installs wheels on the vehicle. Hence, there is a need to improve the way locations of a tire sensor on a chassis of a vehicle may be determined.

SUMMARY

It is an object of embodiments herein to provide a systems and method therein, along with computer program product and carrier, for enabling a determination of a location of a tire sensor on a chassis of a vehicle that seeks to mitigate, alleviate, or eliminate all or at least some of the above-discussed drawbacks of presently known solutions.

According to a first aspect of embodiments herein, the object is achieved by a method for enabling a determination of a location of a tire sensor on a chassis of a vehicle. The method comprises obtaining an identity of a Radio Frequency Identification, RFID, tag located on the rim, or in the tire, of the wheel. The method also comprises obtaining an identity of a tire sensor mounted on the rim, or inside the tire, of the wheel, as the tire sensor is activated. The method further comprises establishing an association between the identity of the RFID tag and the identity of the tire sensor.

By establishing an association between the identities of an RFID tag and the tire sensor of a wheel, the identity of a tire sensor mounted in the wheel may subsequently be determined indirectly by only reading the RFID tag of the wheel. This may, for example, be advantageous in cases where wheels are first assembled on their respective tire axles on the vehicle at a tire assembly station, and later moves forward along an assembly line towards a tire diagnostic station. At the tire diagnostic station, dedicated tire RFID readers may be configured to read each of the RFID tags of the tires/rims of the vehicle and determine their location on the chassis of the vehicle axle by axle while the vehicle is still moving on the assembly line. Since the axles of the vehicle will pass the RFID readers at different times and at low speeds, the axle locations of each of the RFID tags may easily be determined. Hence, by reading and locating the logistical RFID tags inside the tires/rims of the vehicle, the location of the tire sensors on the chassis of the vehicle for the vehicle may be determined using the established association. Thus, an improved way of determining locations of tire sensors on a chassis of a vehicle is enabled.

In some embodiments, the method may further comprise determining the location of the tire sensor on the chassis of the vehicle based on the established association between the identity of the RFID tag and the identity of the tire sensor. As described in the advantageous example above, similar diagnostics stations utilizing the established associations between identities of an RFID tag and the tire sensor of a wheel may also be implemented at, e.g. tire assembly lines, tire fitting stations/centres or workshops, for a more efficient determination of the locations of tire sensors on a chassis of a vehicle.

According to some embodiments, the identity of the RFID tag is obtained prior to the identity of a tire sensor. This may in some cases be preferable since the reading of the RFID tag and its identity is usually simpler and easier than activating the tire sensor in order to obtain the reading of the tire sensor and its identity. In this case, there may also be an RFID tag on record already associated with the wheel and/or location on a chassis of a vehicle to which a subsequently obtained identity of a tire sensor may be easily associated with. In some embodiments, the tire sensor may be activated by a Radio Frequency, RF, signal or by inflating the tire on the rim. Here, the RF signal may, for example, be a Low-Frequency magnetic field generated in the proximity of the tire sensor. Optionally, the activation may be caused by achieving a delta pressure, i.e. detection of a pressure difference in the tire by the tire sensor. The obtaining of the identity of the tire sensor may, according to some embodiments, comprise receiving an RF signal comprising the identity of the tire sensor from the tire sensor.

According to some embodiments, the method may further comprise obtaining a chassis identity based the identity of the RFID tag. This means that further information may also be associated with the identity of the RFID tag, such as, e.g. a chassis identity. In this case, the method may according to some embodiments further comprise establishing an association between the identity of the RFID tag and the chassis identity, and determining a location of the tire sensor on the chassis of the vehicle based on the associated chassis identity. If a chassis identity is associated with the identity of the RFID tag, it may indicate or be used to obtain information indicating the exact wheel location where the wheel is to be mounted on that particular chassis, e.g. in case the tire or rim of the wheel is tailored to a specific axle and position on that axle of a vehicle, such as, e.g. right or left, inner or outer position for a twin wheel configuration, etc. This may be particularly advantageous in case of having fitted wheels, with tire sensor mounted inside, being tailored for a specific vehicle chassis ID and/or a specific position on a chassis delivered to an assembly line for assembly on the vehicle.

According to some embodiments, the method may further comprise providing instructions, to an operator or an automated tire fitting system, indicating a location on the chassis of the vehicle at which the wheel is to be assembled based on the determined location of the tire sensor on the chassis of the vehicle. This means that the obtained chassis identity may be used in order to automate the assembly of wheels on a vehicle, but also to avoid human error causing a wheel to be assembled in the wrong wheel location on chassis.

According to a second aspect of embodiments herein, the object is achieved by a system for enabling a determination of a location of a tire sensor on a chassis of a vehicle. The system comprise a processing circuitry configured to obtain an identity of a RFID tag located on the rim, or in the tire, of the wheel. The processing circuitry is also configured to obtain an identity of a tire sensor mounted on the rim, or inside the tire, of the wheel, as the tire sensor is activated. The processing circuitry is further configured to establish an association between the identity of the RFID tag and the identity of the tire sensor.

In some embodiments, the processing circuitry may also be configured to determine the location of the tire sensor on the chassis of the vehicle based on the established association between the identity of the RFID tag and the identity of the tire sensor. According to some embodiments, the processing circuitry may further be configured to obtain the identity of the RFID tag via an RFID scanner prior to obtaining the identity of a tire sensor. In some embodiments, the tire sensor may be activated by a RF signal or by inflating the tire on the rim. Further, in some embodiments, the processing circuitry may be further configured to obtain the identity of the tire sensor from a receiver configured to receive an RF signal comprising the identity of the tire sensor from the tire sensor.

According to some embodiments, the processing circuitry may further be configured to obtain a chassis identity based on the identity of the RFID tag. In this case, the processing circuitry may also be configured to establish an association between the identity of the RFID tag and the chassis identity, and determine a location of the tire sensor on the chassis of the vehicle based on the associated chassis identity. Here, according to some embodiments, the processing circuitry may further be configured to provide instructions, to an operator or an automated tire fitting system, indicating a location on the chassis of the vehicle at which the wheel is to be assembled based on the determined location of the tire sensor on the chassis of the vehicle. In some embodiments, the system may be located in a tire fitment center/station.

According to a third aspect of the embodiments herein, the object is achieved by a computer program comprising instructions which, when executed in a processing circuitry, cause the processing circuitry to carry out the methods described above. According to a fourth aspect of the embodiments herein, the object is achieved by a carrier containing any of the computer program products described above, wherein the carrier is one of an electronic signal, optical signal, radio signal, or computer-readable storage medium.

BRIEF DESCRIPTION OF THE DRAWINGS

Features and advantages of the embodiments will become readily apparent to those skilled in the art by the following detailed description of exemplary embodiments thereof with reference to the accompanying drawings, wherein.

DETAILED DESCRIPTION

Figure 1:
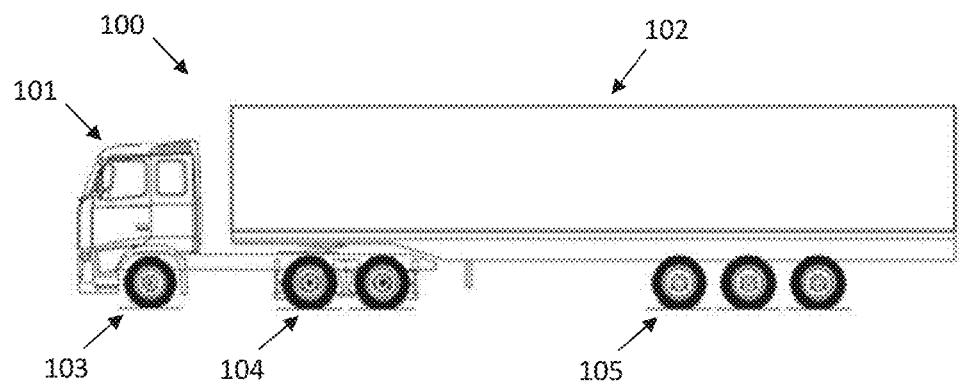
FIG. 1 is a side view of a vehicle.

The invention will now be described more fully hereinafter with reference to the accompanying drawings, in which certain aspects of the invention are shown. This invention may, however, be embodied in many different forms and should not be construed as limited to the embodiments and aspects set forth herein; rather, these embodiments are provided by way of example so that this disclosure will be thorough and complete, and will fully convey the scope of the invention to those skilled in the art. Like numbers refer to like elements throughout the description. It is to be understood that the present invention is not limited to the embodiments described herein and illustrated in the drawings; rather, the skilled person will recognize that many changes and modifications may be made within the scope of the appended claims.

FIG. 1 illustrates an example of a vehicle 100. In this case, the vehicle 100 is exemplified as a heavy-duty vehicle combination for cargo transport, i.e. a truck/towing vehicle 101 configured to tow a trailer unit 102 in a known manner, e.g. by a fifth wheel connection. The vehicle 100 comprises wheels 103, 104, and 105. It should be noted that with the term heavy-duty vehicle herein is meant a vehicle designed for the handling and transport of heavier objects or large quantities of cargo. The term heavy-duty vehicle may, however, also refer to a vehicle designed for use in construction, mining operations, or similar, such as, a working or construction machine. It should also be noted that even though the embodiments herein for enabling a determination of a location of a tire sensor on a chassis of a vehicle are described mainly with respect to a heavy-duty vehicle, such as, the heavy-duty vehicle combination 101, 120 in FIG. 1, the embodiments herein should not be considered restricted to this particular type of vehicle but may also be used in other types of vehicles, such as, passenger cars, commercial vehicles, busses, etc.

Figure 2:
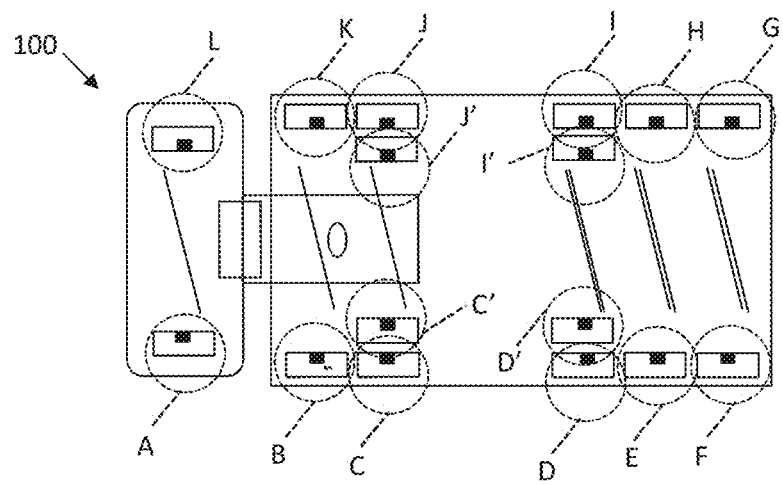
FIG. 2 is a schematic illustration of a vehicle and wheel locations thereon.

FIG. 2 illustrates a first top-side view of the vehicle 100 and wheel positions A-L thereon. In this example, the wheel position A is the front left wheel position of the truck or towing vehicle 101 of the vehicle 100, while the wheel position L is the front right wheel position of the truck or towing vehicle 101 of the vehicle 100. Furthermore, the wheel positions of the trailer unit 102 ranges around the trailer unit 102 from the wheel position B for the front left wheel of the trailer unit 102 to the wheel position K of the front right wheel of the trailer unit 102. In some cases, certain wheel positions may comprise a set of twin wheels as illustrated for the wheel positions C, D, I, and J. In this case, the outermost wheel position of the set of twin wheels is referred to as C, D, I, and J, respectively, while the innermost wheel position of the set of twin wheels is referred to as C', D', I', and J'. It should also be noted that the notation of the wheel positions is merely made for sake of illustrative purposes to provide a clear and concise references to different wheel positions; in other words, this notation should not be construed as limiting to the embodiments herein.

Figure 3:
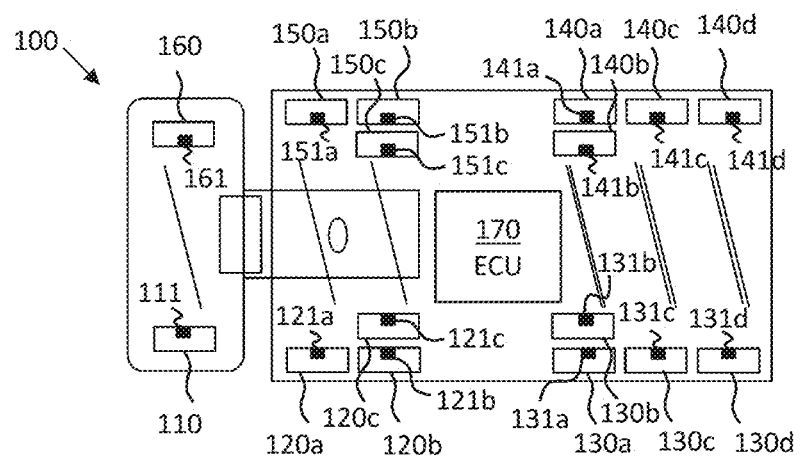
FIG. 3 is a schematic illustrations of a vehicle having tires with tire sensors at each wheel location.

FIG. 3 illustrates a second top-side view of the vehicle 100 having wheels 110, 120, 130, 140, 150, 160 comprising tire sensors 111, 121, 131, 141, 151, 161 at each wheel position A-L on the vehicle 100 as described above in FIG. 2. The vehicle 100 further comprise an electronic control unit, ECU 170. In this example, the wheel 110 at the wheel position A of the truck or towing vehicle 101 of the vehicle 100 comprise at least one tire sensor 111, while the wheel 120 at the wheel position L of the truck or towing vehicle 101 of the vehicle 100 comprise at least one tire sensor 121. Similarly, each wheel 120a, 120b, 120c at the two front left wheel positions B, C, C' of the trailer unit 102 of the vehicle 100 comprise each at least one tire sensor 121a, 121b, 121c, respectively. Also, each wheel 130a, 130b, 130c, 130d at the three back left wheel positions D, D', E, F of the trailer unit 102 of the vehicle 100 comprise each at least one tire sensor 131a, 131b, 131c, 131d, respectively. Furthermore, each wheel 140a, 140b, 140c, 140d at the three back right wheel positions I, I', H, G of the trailer unit 102 of the vehicle 100 comprise each at least one tire sensor 141a, 141b, 141c. Lastly, each wheel 150a, 150b, 150c at the two front right wheel positions K, J, J' of the trailer unit 102 of the vehicle 100 comprise each at least one tire sensor 151a, 151b, 151c. The ECU 170 and each of the one or more tire sensors 111, 121, 131, 141, 151, 161 on the vehicle 100 may be part of an on-board Tire Pressure Monitor System/Tire Health System, TPMS/THS. In other words, the one or more tire sensors 111, 121, 131, 141, 151, 161 on the vehicle 100 may be TPMS/THS sensors, and the ECU 170 may be a TPMS/THS sensor reader. The one or more tire sensors 111, 121, 131, 141, 151, 161 on the vehicle 100 may also be referred to as TPMS/THS transponders. Furthermore, each tire and/or rim of each of the wheels 110, 120, 130, 140, 150, 160 may also have one or more integrated or mounted Radio Frequency Identification, RFID, sensor, i.e. RFID tag. The RFID tags (not shown) enable identification of the specific tire and/or specific rim of each of the wheels 110, 120, 130, 140, 150, 160 using radio frequency transmissions.

Figure 4:
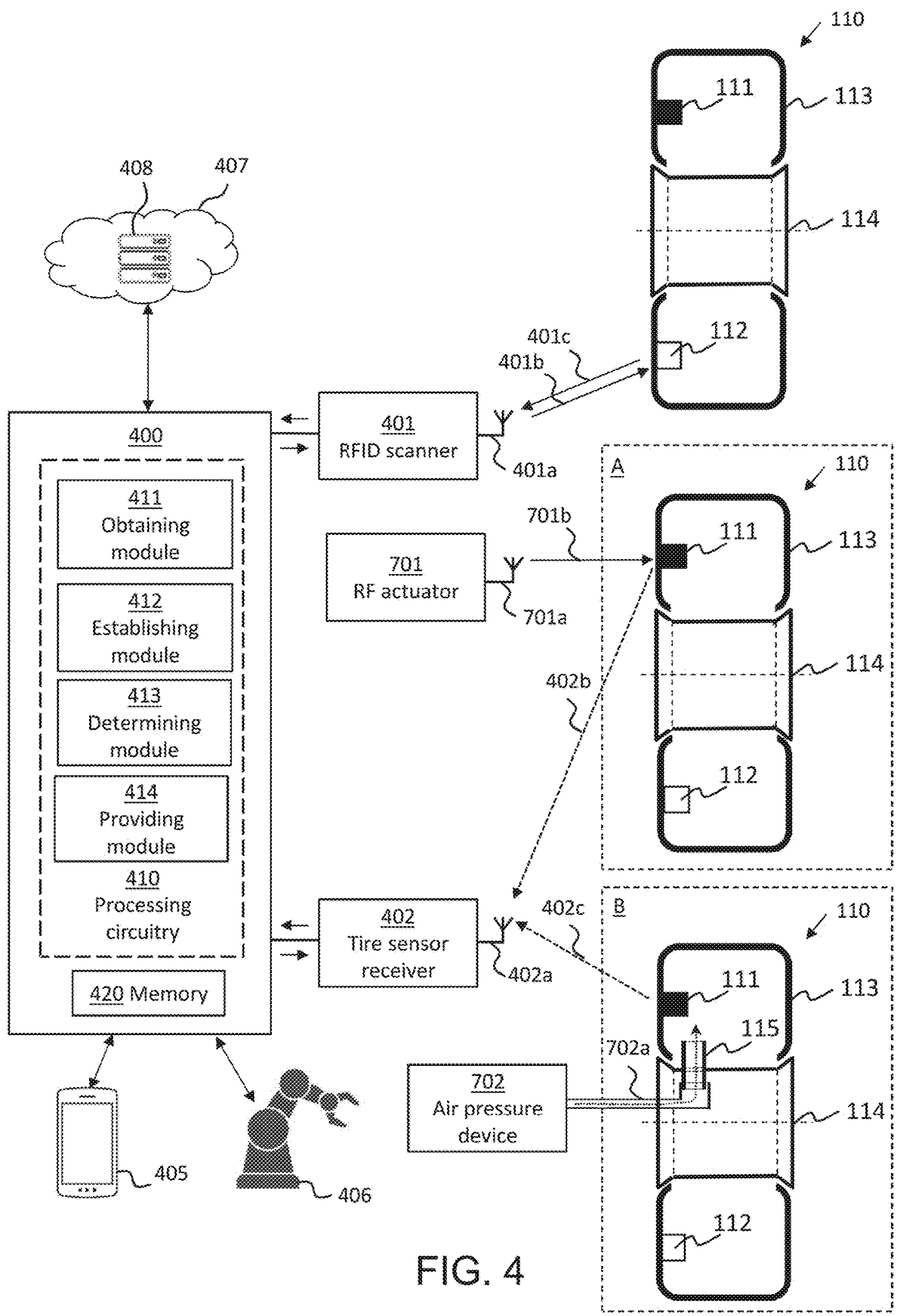
FIG. 4 is a schematic illustration of a system according to some embodiments.

FIG. 4 shows a schematic illustration of a system 400 for enabling a determination of a location A-L of a tire sensor 111 on a chassis of a vehicle 100 according to some embodiments. It should be noted that, although not shown in FIG. 4, known conventional features of the system 400, such as, for example, a power source, e.g. a battery or main connection, may be assumed to be comprised in the system 400.

The system 400 may comprise, or be arranged to be connected to and configured to communicate with, an RFID scanner 401. The RFID scanner 401 may be configured to scan for RFID tags, such as, the RFID tag 112 in the tire 110. The RFID scanner 402 may comprise an antenna 401a for transmitting an RFID signal towards the RFID tag 112. The RFID signal may, for example, be an RFID interrogation signal and/or a generated electromagnetic field configured to trigger a RFID response from the RFID tag 112. Hence, as the RFID tag 112 receives the RFID signal 401b from the RFID scanner 401, the RFID tag 112 will respond with a RFID response signal 401c comprising the identity of the RFID tag. In other words, the RFID scanner 402 may receive a RFID response signal from the RFID tag 112 in response to the RFID tag 112 receiving its transmitted RFID signal 401b.

Also, the system 400 may comprise, or be arranged to be connected to and configured to communicate with, a tire sensor receiver 402 configured to receive or read tire sensor signals transmitted from the tire sensor 111. For example, the tire sensor receiver 402 may be a TPMS/THS system receiver configured to receive or read signal from TPMS/THS sensors 111, 121, 131, 141, 151, 161 in the tires of the wheels 110, 120, 130, 140, 150, 160 in the vehicle 100. The tire sensor receiver 402 may comprise an antenna 402a for receiving the tire sensor signals 402b, 402c from the tire sensor 111.

Here, according to some embodiments, the tire sensor signal 402b may be triggered by a Radio Frequency, RF, signal from a RF actuator 701 according to a first scenario A shown in FIG. 4. The RF actuator 701 may comprise an antenna 701a configured to generate a low-frequency magnetic field or RF signal 701b causing the tire sensor 111 to be activated and transmit the tire sensor signal 402b. Optionally, in some embodiments, the tire sensor signal 402c may be triggered by an air pressure device 702 arranged to inflate the tire 113 on the rim 114 of the wheel 110 according to a second scenario B shown in FIG. 4. The air pressure device 702 may comprise an air guidance arrangement 702a for guiding pressurized air into the tire 113 via an air inlet valve 115 of the wheel 110 and thus inflate the tire 113. The pressure difference, i.e. delta pressure, will be sensed by the tire sensor 111 causing the tire sensor 111 to be activated and transmit the tire sensor signal 402c. Here, it should be noted that the RF actuator 701 and/or the air pressure device 702 may form part of the system 400 or the automated tire fitting system 406 described below. Optionally, the LF actuator 701 and/or the air pressure device 702 may also be stand-alone devices operated separately by an operator of the system 400.

According to some embodiments, the system 400 may also comprise, or be arranged to be connected to and communicate with, a display 405 and/or an automated tire fitting system 406. The display 405, or display interface, may be used by the system 400 to communicate with an operator of the system 400. The automated tire fitting system 406 may be arranged to automatically fit and inflate a tire 113 on a rim 114 of the wheel 110. Additionally, the system 400 may also comprise, or be arranged to be connected to and configured to communicate with, a database server or cloud service 408 in a connected or remote network 407 for digital information storage.

The system 400 further comprise a processing circuitry 410 and a memory 420. It should also be noted that some or all of the functionality described in the embodiments herein as being performed by the system 400 may be provided by the processing circuitry 410 executing instructions stored on a computer-readable medium, such as, the memory 420 shown in FIG. 4. For example, the processing circuitry 410 may be configured to communicate with the RFID scanner 401 and obtain information indicating the identity and location of the RFID tag 112 in the tire 113. The processing circuitry 410 may further be arranged to communicate with the display 405 and/or automated tire fitting system 406. Furthermore, the processing circuitry 410 may further comprise additional components, such as, for example, an obtaining module 411, an establishing module 412, a determining module 413, and a providing module 414, each responsible for providing its functionality to support the embodiments described herein.

The system 400 or processing circuitry 410 is configured to, or may comprise the obtaining module 411 configured to, obtain an identity of a RFID tag 112 located on the rim 114, or in the tire 113, of the wheel 110. Also, the system 400 or processing circuitry 410 is configured to, or may comprise the obtaining module 411 configured to, obtain an identity of a tire sensor 111 mounted on the rim 114, or inside the tire 113, of the wheel 110, as the tire sensor 111 is activated. Further, the system 400 or processing circuitry 410 is configured to, or may comprise the establishing module 412 configured to, establish an association between the identity of the RFID tag 112 and the identity of the tire sensor 111. In some embodiments, the system 400 or processing circuitry 410 may be configured to, or may comprise the determining module 412 configured to, determine the location A-L of the tire sensor 111 on the chassis of the vehicle 100 based on the established association between the identity of the RFID tag 112 and the identity of the tire sensor 111.

According to some embodiments, the system 400 or processing circuitry 410 may be configured to, or may comprise the obtaining module 411 configured to, obtain the identity of the RFID tag 112 via an RFID scanner 401 prior to obtaining the identity of a tire sensor 111. In some embodiments, the tire sensor 111 may be activated by a RF signal or by inflating the tire 113 on the rim 114. Also, in some embodiments, the system 400 or processing circuitry 410 may be configured to, or may comprise the obtaining module 411 configured to, obtain the identity of the tire sensor 111 from a tire sensor receiver 402 configured to receive an RF signal comprising the identity of the tire sensor 111 from the tire sensor 111.

Figure 6:
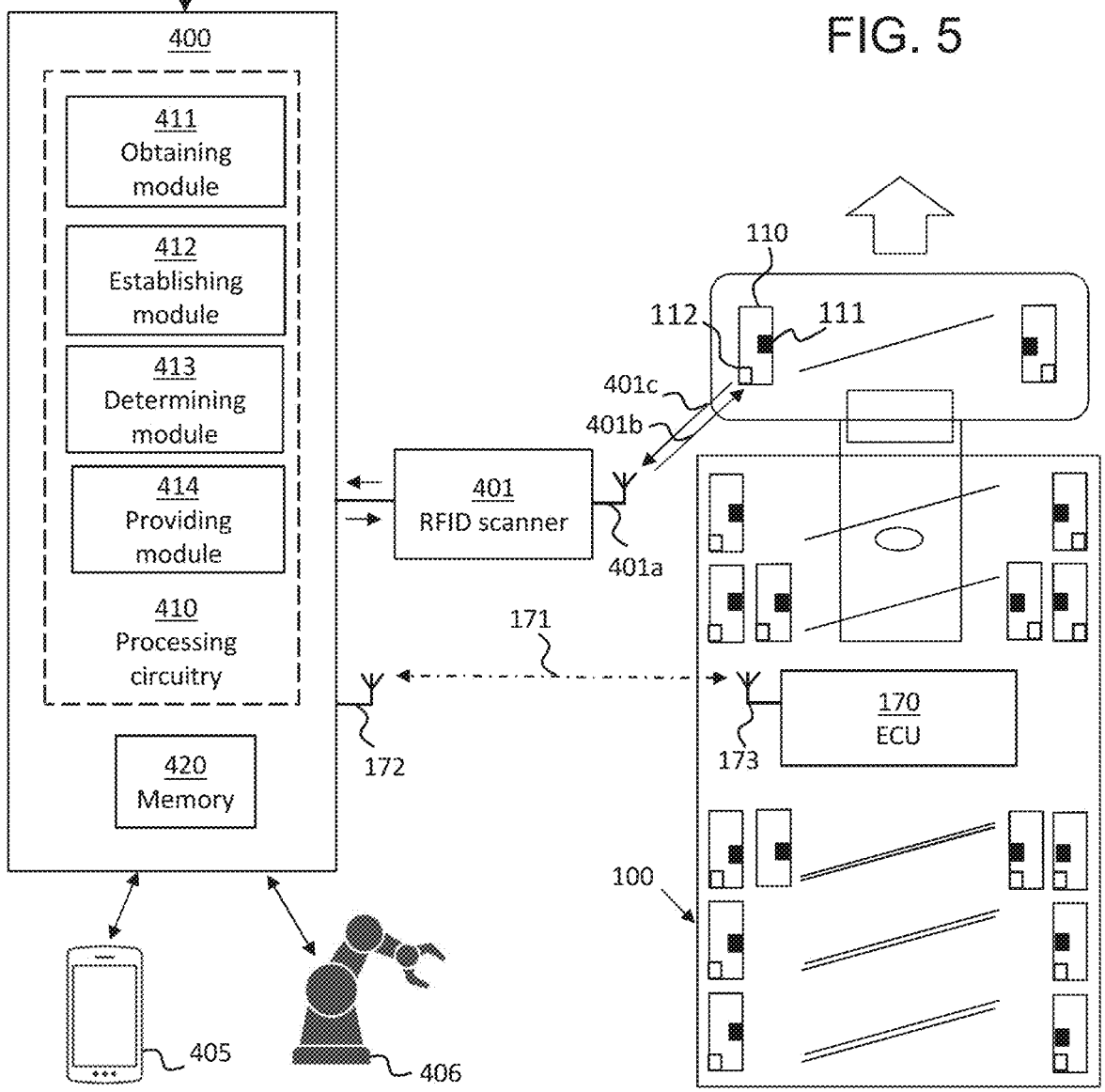
FIG. 6 is another schematic illustration of a system according to some embodiments.

Further, in some embodiments, the system 400 or processing circuitry 410 may be configured to, or may comprise the obtaining module 411 configured to, obtain a chassis identity based on the identity of the RFID tag 112. In this case, the system 400 or processing circuitry 410 may also be configured to, or may comprise the establishing module 412 configured to, establish an association between the identity of the RFID tag 112 and the chassis identity. Here, the system 400 or processing circuitry 410 may further be configured to, or may comprise the determining module 413 configured to, determine a location A-L of the tire sensor 111 on the chassis of the vehicle 100 based on the obtained chassis identity. Further, according to some embodiments, the system 400 or processing circuitry 410 may be configured to, or may comprise the providing module 414 configured to, provide instructions, to an operator via a display 405 or an automated tire fitting system 406, indicating a location A-L on the chassis of the vehicle 100 at which the wheel 110 is to be fitted based on the determined location A-L of the tire sensor 111 on the chassis of the vehicle 100. Additionally, in some embodiments, the system 400 may be located in a tire fitting center/station. In some embodiments, the system 400 may also be configured to communicate with a TPMS/THS system in the ECU 170 on-board the vehicle 100, e.g. via a radio transmission 171 between the antennas 172 and 173 as shown in FIG. 6. In this case, the system 400 or processing circuitry 410 may be configured to, or may comprise the providing module 414 configured to, provide information indicating the determined location A-L of the tire sensor 111 on a chassis of a vehicle 100 to the TPMS/THS system in the ECU 170 on-board the vehicle 100.

Furthermore, the embodiments for enabling a determination of a location of a tire sensor 111 on a chassis of a vehicle 100 described above may be at least partly implemented through one or more processors, such as, the processing circuitry 410 in the system 400 depicted in FIG. 4, together with computer program code for performing the functions and actions of the embodiments herein. The program code mentioned above may also be provided as a computer program product, for instance in the form of a data carrier carrying computer program code or code means for performing the embodiments herein when being loaded into the processing circuitry 410 in the system 400. The data carrier, or computer readable medium, may be one of an electronic signal, optical signal, radio signal or computer-readable storage medium. The computer program code may e.g. be provided as pure program code in the system 400 or on a server and downloaded to the system 400. Thus, it should be noted that the system 400 may in some embodiments be implemented as computer programs stored in memory 420 in FIG. 4, e.g. the computer readable storage unit/module, for execution by processors or processing modules, e.g. the processing circuitry 410 in the system 400 in FIG. 4.

Those skilled in the art will also appreciate that the processing circuitry 410 and the memory 420 described above may refer to a combination of analog and digital circuits, and/or one or more processors configured with software and/or firmware, e.g. stored in a computer readable storage unit/module, that when executed by the one or more processors such as the processing circuitry 410 perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

Figure 5:
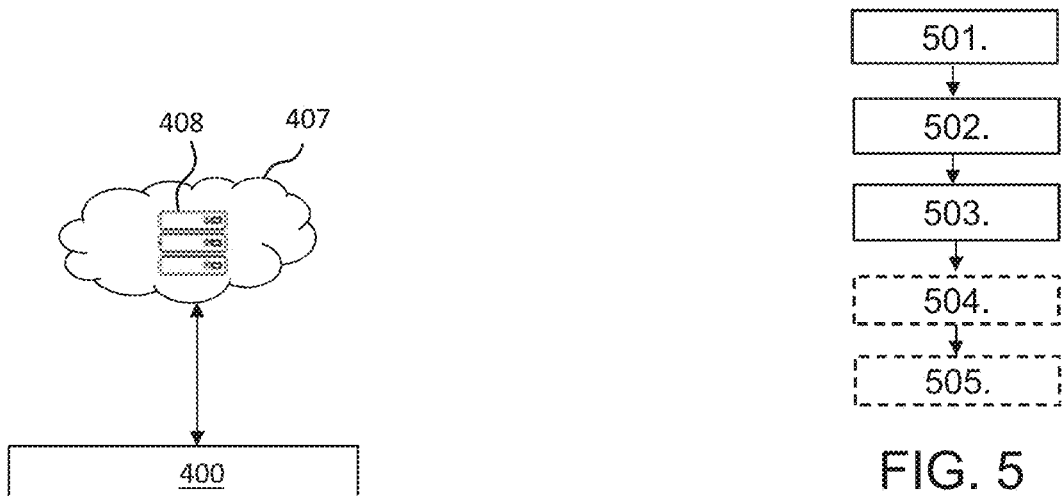
FIG. 5 is a flowchart illustrating embodiments of a method according to some embodiments.

Examples of embodiments of a method for enabling a determination of a location A-L of a tire sensor 111 on a chassis of a vehicle 100, will now be described with reference to the flowchart depicted in FIG. 5. FIG. 5 is an illustrated example of actions, steps or operations which may be performed a system 400 described above with reference to FIG. 4. The method may comprise the following actions, steps or operations.

Action 501. The system 400 obtains an identity of an RFID tag 112 located on the rim 114, or in the tire 113, of the wheel 110. This may, for example, be performed by using the RFID scanner 401 shown in FIG. 4. In some embodiments, the identity of the RFID tag 112 may be obtained prior to the identity of a tire sensor 111. This means that the identity of the RFID tag 112 may be obtained by the system 400 according to Action 501 before the system obtains the identity of a tire sensor 111 according to Action 502 described below. According to some embodiments, the system 400 may also obtain a chassis identity based the identity of the RFID tag 112. In some cases, a vehicle chassis identity may be linked to a particular RFID tag 112. For example, in case the wheel 110 is tailored to a specific axle and position on that axle, such as, e.g. right or left side, inner or outer position in a twin wheel configuration, etc. In some case, the vehicle chassis identity may be retrieved from an information database server or via a cloud service.

Action 502. Preferably, but not necessarily, after the system 400 obtains the identity of the RFID tag 112 in Action 501, the system 400 obtains an identity of a tire sensor 111 mounted on the rim 114, or inside the tire 113, of the wheel 110, as the tire sensor 111 is activated. Here, the tire sensor 111 may, for example, be activated using one of the scenarios A or B described above with reference to FIG. 4. Thus, according to some embodiments, the tire sensor 111 may be activated by an RF signal or by inflating the tire 113 on the rim 114. In some embodiments, the system 400 may receive an RF signal comprising the identity of the tire sensor 111 from the tire sensor 111. This may, for example, be performed by using the tire sensor receiver 402 shown in FIG. 4.

Action 503. After, or upon, obtaining the identity of the tire sensor 111 in Action 502, the system 400 establishes an association between the identity of the RFID tag 112 and the identity of the tire sensor 111. This means, for example, that the system 400 may pair and store the identity of the RFID tag 112 and the identity of a tire sensor 111 together in a computer-readable storage medium, such as, e.g. the memory 420 or the database server or cloud service 408 in a connected or remote network 407. Hence, the identity of the RFID tag 112 will be digitally linked to the identity of a tire sensor 111. This also means that by identifying either one of the RFID tag 112 or the tire sensor 111, the other one is inherently or indirectly identified as well. If a chassis identity was additionally obtained, the system 400 may according to some embodiments further establish an association between the identity of the RFID tag 112 and the chassis identity. This means that the obtained chassis identity may also be linked or paired with the RFID tag 112 in the computer-readable storage medium, such as, e.g. the memory 420 or the database server 408 located in an external network 407.

Action 504. Optionally, after an association has been established in accordance with Action 503, the system 400 may determine the location A-L of the tire sensor 111 on the chassis of the vehicle 100 based on the established association between the identity of the RFID tag 112 and the identity of the tire sensor 111. This means that, for example, as the wheel 110 has been assembled on the chassis of the vehicle 100, the established association between the identity of the RFID tag 112 and the identity of the tire sensor 111 may be used to determine the location A-L of the tire sensor 111 on the chassis of the vehicle 100 simply by obtaining the identity of the RFID tag 112. This is exemplified in FIG. 6.

In FIG. 6, the system 400 obtains the identity of the RFID tag 112 as the vehicle 100 passes by or is actively scanned by the RFID scanner 401. In this process, the system 400 may automatically determine the wheel location A of the RFID tag 112 on the chassis of the vehicle 100 based on the setup or use of the RFID scanner 401. Consequently, via the established association between the identity of the RFID tag 112 and the identity of the tire sensor 111, the system 400 is able to determine the identity of the tire sensor 111. Inherently, the wheel location A of the tire sensor 111 on the chassis of the vehicle 100 may be determined since the RFID tag 112 and the tire sensor 111 are located in the same wheel 110. This also means that the system 400 is able to provide information indicating the determined location A-L of the tire sensor 111 on a chassis of a vehicle 100 to the TPMS/THS system in the ECU 170 on-board the vehicle 100. As shown in FIG. 6, this may, for example, be performed via a radio transmission 171 from an antennas 172 of the system 400 to an antenna 173 of the TPMS/THS system in the ECU 170 on-board the vehicle 100. Optionally, a wired connection to between the system 400 and the TPMS/THS system in the ECU 170 on-board the vehicle 100 may be used.

In case a chassis identity is associated with the RFID tag 112, the system 400 may further determine a location A-L of the tire sensor 111 on the chassis of the vehicle 100 based on the associated chassis identity. This means that by obtaining the identity of the RFID tag 112, the system 400 may also obtain information associated with the RFID tag 112 indicating a vehicle chassis identity. The vehicle chassis identity may in turn provide information regarding the exact location A-L on the chassis of the vehicle 100 in which the wheel 110 is to be assembled on that particular chassis. This information enables the system 400 to, for example, automate the assembly of the wheel 110 on the vehicle 100, but may also enable human error causing the wheel 110 to be assembled on a faulty/wrong location on the chassis of the vehicle 100 to avoided.

Action 505. According to another option, the system 400 may also provide instructions, to an operator via a display 605 or an automated tire fitting system 606, indicating a location A-L on the chassis of the vehicle 100 at which the wheel 110 is to be assembled based on the determined location A-L of the tire sensor 111 on the chassis of the vehicle 100. This means that the system 400 may use the determined information in order to automate the tire assembly of the wheel 110 on the vehicle 100, e.g. via the automatic tire fitting system 406. It also means that the system 400 may use the determined information in order to avoid human error in the tire assembly, e.g. by indicating to an operator of the system 400 at which location the wheel 110 should be assembled.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatuses, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

It should also be noted that the various example embodiments described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes. The embodiments herein are not limited to the above described preferred embodiments. Various alternatives, modifications and equivalents may be used. Therefore, the above embodiments should not be construed as limiting.

The invention claimed is:

1. A method for enabling a determination of a location of a tire sensor on a chassis of a vehicle, wherein the method comprises:
    obtaining an identity of an Radio Frequency Identification, RFID, tag located on a rim, or in a tire, of a wheel;
    obtaining an identity of a tire sensor mounted on the rim, or inside the tire, of the wheel, as the tire sensor is activated;
    establishing an association between the identity of the RFID tag and the identity of the tire sensor;
    obtaining a chassis identity based the identity of the RFID tag;
    establishing an association between the identity of the RFID tag and the chassis identity; and
    determining the location of the tire sensor on the chassis of the vehicle based on the established association between the identity of the RFID tag, the identity of the tire sensor and the associated chassis identity.

2. The method according to claim 1, wherein the identity of the RFID tag is obtained prior to the identity of a tire sensor.

3. The method according to claim 1, wherein the tire sensor is activated by a Low-Frequency, LF, radio signal or by inflating the tire on the rim.

4. The method according to claim 1, wherein the obtaining the identity of the tire sensor comprises receiving an RF signal comprising the identity of the tire sensor from the tire sensor.

5. The method according to claim 1, further comprising
    providing instructions, to an operator via a display or an automated tire fitting system, indicating a location on the chassis of the vehicle at which the wheel is to be assembled based on the determined location of the tire sensor on the chassis of the vehicle.

6. A system for enabling a determination of a location of a tire sensor on a chassis of a vehicle, wherein the system comprises a processing circuitry configured to
    obtain an identity of a Radio Frequency Identification, RFID, tag located on a rim, or in the a, of a wheel,
    obtain an identity of a tire sensor mounted on the rim, or inside the tire, of the wheel, as the tire sensor is activated, and establish an association between the identity of the RFID tag and the identity of the tire sensor,
    obtain a chassis identity based on the identity of the RFID tag, establish an association between the identity of the RFID tag and the chassis identity, and determine a location of the tire sensor on the chassis of the vehicle based on the established association between the identity of the RFID tag, the identity of the tire sensor and the associated chassis identity.

7. The system according to claim 6, wherein the processing circuitry is further configured to obtain the identity of the RFID tag via an RFID scanner prior to obtaining the identity of a tire sensor.

8. The system according to claim 6, wherein the tire sensor is activated by a Radio Frequency, RF, signal or by inflating the tire on the rim.

9. The system according to claim 6, wherein the processing circuitry is further configured to obtain the identity of the tire sensor via a tire sensor receiver configured to receive an RF signal comprising the identity of the tire sensor from the tire sensor.

10. The system according to claim 6, wherein the processing circuitry is further configured to provide instructions, to an operator via a display or an automated tire fitting system, indicating a location on the chassis of the vehicle at which the wheel is to be assembled based on the determined location of the tire sensor on the chassis of the vehicle.

11. The system according to claim 6, wherein the system is located in a tire fitment center/station.

12. A non-transitory computer program carrier carrying a computer program for performing the steps of claim 1 when said computer program is run on a computer, wherein the computer program carrier is a computer-readable storage medium.

* * * * *